Patented Mar. 10, 1953

2,631,153

UNITED STATES PATENT OFFICE 2,631,153

MANUFACTURE OF MERCAPTO ARYL THIAZOLES

Philip T. Paul and Gordon A. Anderson, Naugatuck, Conn., assignors to United States Rubber Company, New York, N. Y., a corporation of New York No Drawing. Application March 29, 1951, Serial No. 218,280

6 Claims. (Cl. 260—306)

This invention relates to improvements in the manufacture of mercaptoaryl thiazoles.

An object of this invention is to provide a method of preparing mercaptoarylthiazoles whereby they may be obtained in a very highly purified state. Other objects will be apparent from the following hereinafter description.

Mercaptobenzothiazole, the most commonly known mercaptoarylthiazole is, as well known, prepared from aniline, carbon bisulfide, and sulfur, according to the equation:

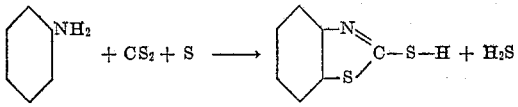

In such a process, as shown for example by U. S. Patent No. 1,631,871, aniline, carbon bisulfide, and sulfur are autoclaved several hours during which time the hydrogen sulfide formed in the reaction is valved off. At the end of the reaction the crude reaction mass is discharged into water and then extracted with dilute sodium hydroxide or other alkali metal hydroxide, whereby the mercaptobenzothiazole is solubilized as the alkali metal salt. The aqueous solution of the sodium benzothiazyl mercaptide is allowed to stand until the impurities have settled out, after which it is separated and acidified to isolate the free mercaptobenzothiazole. The mercaptobenzothiazole thus obtained usually assays approximately 92–95% mercaptobenzothiazole.

The alkali extracted reaction mass contains impurities that were associated with the mercaptobenzothiazole in the crude reaction mass before treatment with the alkali. Since the present process depends on the oxidation or conversion of those impurities without otherwise reducing the mercaptobenzothiazole content, other processes for preparing 2-mercaptoarylene thiazoles that have associated with the 2-mercaptoarylthiazole as a result of the formative reaction, substantially the same by-product impurities, as those produced from the process in Kelly U. S. Patent No. 1,631,871, may be considered the full equivalent of the Kelly process, for the purpose of this invention. In general, such other processes employ various possible intermediate products of the reaction mixture consisting of carbon bisulfide, sulfur, and a primary aromatic amine. The reaction conditions employed for each are approximately the same, i. e., they are in the same range and each of them produces the 2-mercaptoaryl thiazole with the formation of essentially the same by-products. A number of these related processes are known and they may be illustrated by the processes described in U. S. Patent No. 1,891,198, which describes the use of dianilino methane, sulfur, and carbon bisulfide; U. S. Patent No. 1,858,344 which describes the use of anilinobenzothiazole and hydrogen sulfide; U. S. Patent No. 1,712,963 which describes the use of diphenylthiourea, carbon bisulfide, and sulfur; U. S. Patent No. 1,972,963 which describes the use of anhydroformaldehyde-aniline and sulfur; and U. S. Patent No. 1,865,477 which describes the use of o,o′-diaminodiphenyldisulfide and carbon bisulfide.

According to the invention, it has been discovered that aeration of the aqueous solution of an alkali metal salt of mercaptobenzothiazole, prepared by the interaction of aniline, carbon bisulfide, and sulfur, results in a conversion whereby mercaptobenzothiazole of improved purity may be obtained. During this process of aeration the color of the alkali metal benzothiazyl mercaptide solution gradually changes from dark red to orange or yellow, depending on the concentration, at which stage the aeration may be considered complete and the solution ready for precipitation. Some sulfur may separate as a fine powder during the aeration. Where it does, one decants or draws off the aqueous solution for further treatment. This aqueous solution is then subjected to acidification with a non-oxidizing inorganic acid, usually sulfuric acid, hydrochloric acid, or phosphoric acid, whereby to precipitate mercaptobenzothiazole. Conveniently, filtration and the washing of the precipitated mercaptobenzothiazole should be carried out shortly after the precipitation operation.

The aeration operation can be carried out upon the separated reddish aqueous extract of the alkali metal benzothiazole mercaptide, as just indicated, or it may be carried out upon the unseparated alkali-treated reaction mass as such, or it may be carried out upon an aqueous alkali extract of what are known as the settler heels. These heels are the thick tarry mass that separates when the alkali-treated reaction mass is allowed to stand.

Broadly, the aeration is continued for a time sufficient to show that the mercaptobenzothiazole precipitated by acidification of a portion of the aerated solution shows an optimum desired degree of purity.

It has been found that optimum rates of air oxidation or conversion of impurities occurs when the solution to be aerated has an initial pH of from about 8 to about 9. It has been noticed that at higher pH's the rate of oxidation or conversion falls off.

The aeration can be carried out at any convenient temperature ranging from room temperature (20° C.) up, but preferably should fit in with current production practices as much as possible. These practices usually call for causticizing at temperatures from about 60° C. to 70° C. Conveniently, the aeration can follow and be applied in the neighborhood of this temperature. The time of aeration is variable and depends upon variables such as the rate of air input, the dispersibility of the air or air bubbles, the amount of impurities in the batch, the purity of the mercaptobenzothiazole desired, the concentration of the solution, etc. However, these variables are minor since the aeration can readily be followed by color change or test of the solution, as stated above.

The following example is given to illustrate the invention, the parts being by weight.

*Example*

Aniline (348 lbs.), carbon bisulfide (354 lbs.) and sulfur (120 lbs.) were autoclaved several hours at 260–265° C. during which time the pressure rose to 1050 lbs. per square inch. The gases were valved off and the batch was blown over to 650 gallons water containing 260 lbs. 50% sodium hydroxide at 60° C. and allowed to settle for about an hour. The sodium benzothiazyl mercaptide solution was drawn off from the settler heel.

This solution of sodium benzothiazyl mercaptide was aerated 2 hours at about 60° C. and then precipitated by the addition of sulfuric acid. The precipitate was washed with water and dried. It assayed 99.0% mercaptobenzothiazole and melted 170.0–172.5° C. A sample precipitated before the air blow assayed 95.9% mercaptobenzothiazole and melted 165.0–167.5° C.

Several settler heels from similar plant runs and amounting to about a ton were combined and extracted with 600 gallons water containing 270 pounds 50% caustic soda. Steam was blown in four hours and then the batch was settled for two hours after which the aqueous solution was separated and aerated for twenty-four hours during which time a yellow-brown solid separated and the color changed from a very dark brown to a yellow.

The aerated solution was allowed to settle a short time and then it was separated and acidified to isolate the mercaptobenzothiazole.

Mercaptobenzothiazole assays of the sodium hydroxide extract:

| Before Aerating, Percent | After Aerating, Percent |
| --- | --- |
| 68.5 | 97.3 |

A repeat of this work from the same autoclave batches showed an assay of 69.1% before aerating and 96.8% after aerating.

The tars in the settler after extraction with the 270 lbs. sodium hydroxide showed less than 0.5% mercaptobenzothiazole by analysis.

In addition to increasing the mercaptobenzothiazole assay, the air blowing improves the color of the product and minimizes the obnoxious hydrogen sulfide odor that usually accompanies a precipitation.

The invention may be applied to the homologues and analogues of the benzothiazyl hydrosulfide, of which toluthiazyl hydrosulfide, and naphthothiazyl hydrosulfide are exemplary.

Having thus described our invention, what we claim and desire to protect by Letters Patent is:

1. In a method of purifying mercaptoarylthiazoles having associated therewith substantially the same impurities as where the mercaptothiazoles are produced from interaction of a primary arylamine, sulfur, and carbon bisulfide, and involving extraction and conversion of the mercaptoarylthiazole into an alkali metal salt in aqueous solution, including undesirable impurities resulting from the original reaction, the improvement which comprises passing a stream of air through and throughout the impure aqueous solution of the alkali metal salt of the mercaptoarylthiazole.

2. In a method of preparing purified mercaptobenzothiazole produced from the interaction of aniline, sulfur, and carbon bisulfide, and conversion of the mercaptobenzothiazole into an alkali metal salt thereof in aqueous solution, including undesirable impurities, the improvement which consists in the steps of passing a stream of air through and throughout the impure aqueous solution of the alkali metal salt of the mercaptobenzothiazole, and subsequently acidifying the so-treated aqueous solution to precipitate mercaptobenzothiazole in purified condition.

3. In a process of producing substantially purified mercaptobenzothiazole from reacting aniline, sulfur, and carbon bisulfide, and treating the reaction mass with an alkali metal hydroxide to form an aqueous solution of the alkali metal salt of the mercaptobenzothiazole, including undesirable impurities, the improvement which consists in the steps of passing a stream of air through and throughout the said aqueous solution of said salt, removing any free sulfur that separates, and subsequently acidifying whereby to precipitate mercaptobenzothiazole in a highly purified state.

4. In a method of purifying mercaptoarylthiazoles having associated therewith substantially the same impurities as where the mercaptothiazoles are produced from interaction of a primary arylamine, sulfur, and carbon bisulfide, and involving extraction and conversion of the mercaptoarylthiazole into an alkali metal salt in aqueous solution, including undesirable impurities resulting from the original reaction, the improvement which comprises passing a stream of air through and throughout the impure aqueous solution of the alkali metal salt of the mercaptoarylthiazole, said solution having a pH of from about 8 to about 9.

5. In a method of preparing purified mercaptobenzothiazole produced from the interaction of aniline, sulfur, and carbon bisulfide, and conversion of the mercaptobenzothiazole into an alkali metal salt thereof in aqueous solution, including undesirable impurities, the improvement which consists in the steps of passing a stream of air through and throughout the impure aqueous solution of the alkali metal salt of the mercaptobenzothiazole, said solution having a pH of from about 8 to about 9, and subsequently acidifying the so-treated aqueous solution to precipitate mercaptobenzothiazole in purified condition.

6. In a process of producing substantially purified mercaptobenzothiazole from reacting aniline, sulfur, and carbon bisulfide, and treating the reaction mass with an alkali metal hydroxide to form an aqueous solution of the alkali metal salt of the mercaptobenzothiazole, including undesirable impurities, the improvement which consists in the steps of passing a stream of air through and throughout the said aqueous solution of said salt, said solution having a pH of from about 8 to about 9, removing any free sulfur that separates, and subsequently acidifying whereby to precipitate mercaptobenzothiazole in a highly purified state.

PHILIP T. PAUL.
GORDON A. ANDERSON.

REFERENCES CITED

The following references are of record in the file of this patent:

UNITED STATES PATENTS

| Number | Name | Date |
| --- | --- | --- |
| 2,247,894 | Smith | July 1, 1941 |

FOREIGN PATENTS

| Number | Country | Date |
| --- | --- | --- |
| 574,773 | Great Britain | Jan. 21, 1946 |